Nov. 15, 1927.
L. J. KARPF
1,648,949
APPARATUS FOR TREATING THE FEET
Filed Sept. 1, 1923          2 Sheets-Sheet 2
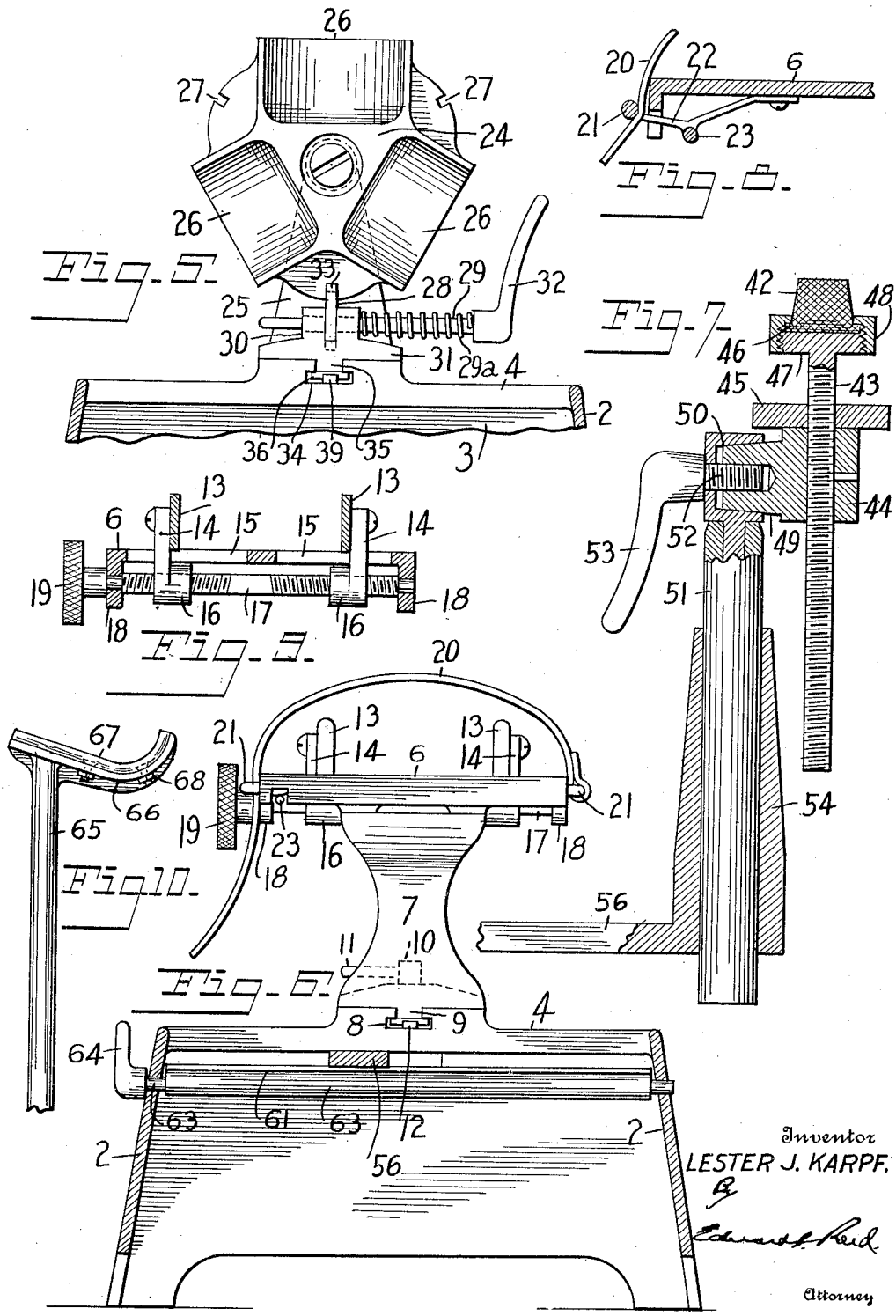
Inventor
LESTER J. KARPF.
Attorney Patented Nov. 15, 1927.

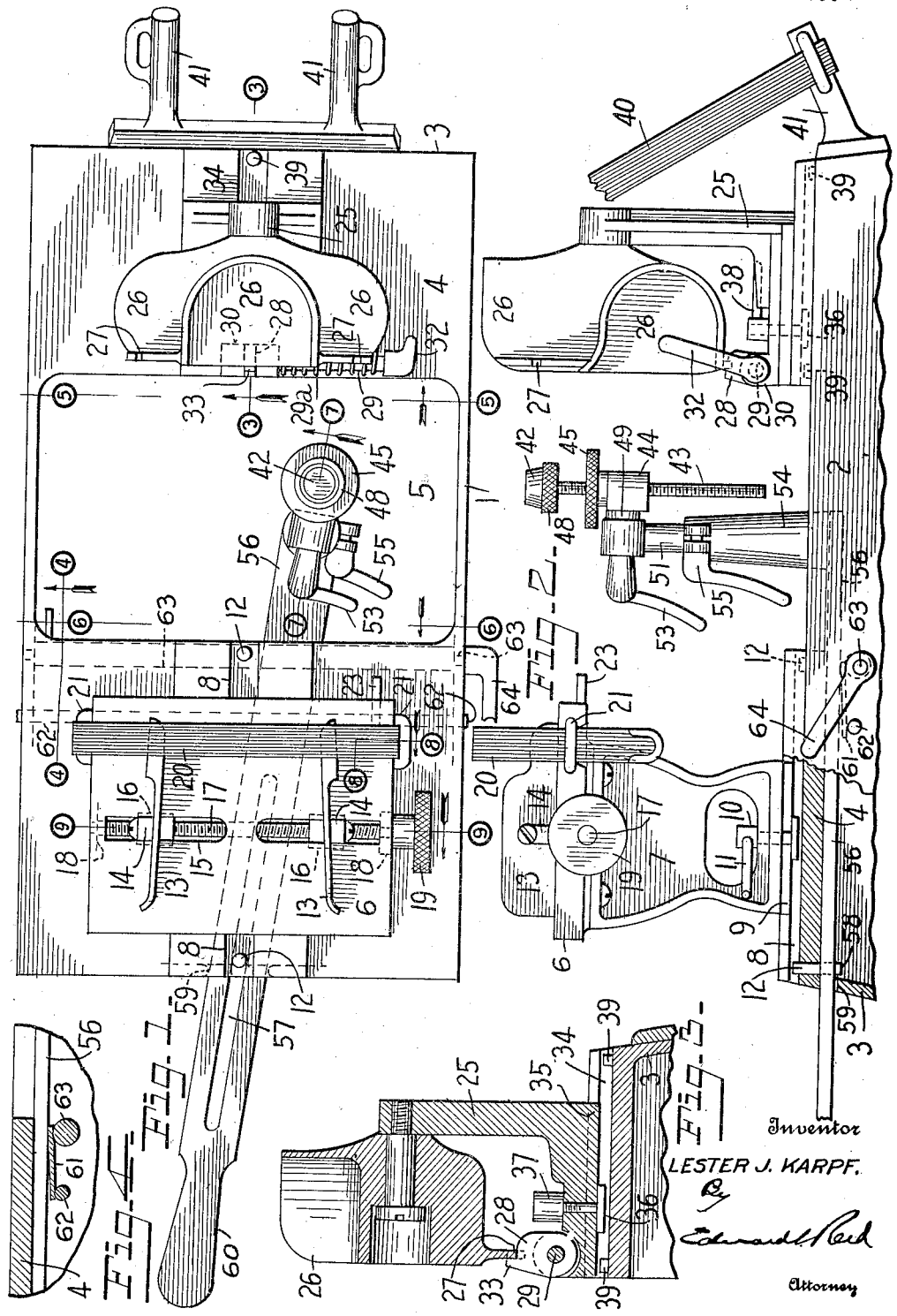

1,648,949

UNITED STATES PATENT OFFICE.

LESTER J. KARPF, OF DAYTON, OHIO.

APPARATUS FOR TREATING THE FEET.

Application filed September 1, 1923. Serial No. 660,471.

This invention relates to an apparatus for treating the human foot and is in the nature of an improvement upon the apparatus shown and described in the application for patent filed by me April 7, 1922, Serial No. 550,528.

The apparatus is designed more particularly for the correction of what is known as "flat foot" which is effected by a re-adjustment of the bones of the foot relative one to the other. To accomplish this I provide means for holding the foot firmly in position and applying upward pressure on one or more bones thereof, while downward pressure is being applied to one or more adjacent bones, this latter pressure being preferably applied through suitable rods or implements, as shown in the above mentioned application.

One object of the invention is to provide an apparatus of this sort which will be simple in its construction and operation and which may easily be adjusted to accommodate it to feet of different sizes and to different treatments.

A further object of the invention is to provide such an apparatus which will have a wide range of adjustment so that it may be used to treat feet of greatly different sizes and to effect the various treatments.

Other objects of the invention will appear as the apparatus is described in detail.

In the accompanying drawings Fig. 1 is a top plan view of an apparatus embodying my invention; Fig. 2 is a side elevation of the same, partly broken away; Fig. 3 is a section taken on the line 3—3 of Fig. 1; Fig. 4 is a section taken on the line 4—4 of Fig. 1; Fig. 5 is a section taken on the line 5—5 on Fig. 1, showing the heel supporting device in elevation; Fig. 6 is a section taken on line 6—6 of Fig. 1 showing the front supporting device in elevation; Fig. 7 is a vertical section taken on the line 7—7 of Fig. 1; Fig. 8 is a sectional detail taken on the line 8—8 of Fig. 1; Fig. 9 is a sectional view taken on line 9—9 of Fig. 1; and Fig. 10 is a detail view of one of the pressure applying implements.

In these drawings I have illustrated one embodiment of my invention but it will be understood that this has been chosen for the purpose of illustration only and that the apparatus may take various forms without departing from the spirit of the invention.

In that particular form of the invention here illustrated, the apparatus comprises a base 1, having side walls 2 and end walls 3. The top wall 4 is provided with a central opening 5 which divides the top wall of the base into front and rear portions. Mounted on the front portion of the top wall of the base is a platform which is adapted to support the front portion or ball of the foot. This platform is preferably adjustable lengthwise of the base and is, in the present instance, supported some distance above the top wall of the base by a standard or bracket 7 which is slidably mounted on the base. As here shown the top wall of the base is provided with a T-slot 8 and the standard has a rib 9 extending into the upper portion of that slot. A clamping bolt 10 extends through the rib or lug 9 and has its head arranged in the lower and wider portion of the T-slot. The upper end of the bolt is provided with a nut 10$^a$ having a handle 11 by which the bolt may be tightened to clamp the standard and the platform in adjusted positions. Stops 12 may be provided to limit the movement of the standard in the slot. Mounted on the platform for lateral adjustment thereon are side plates 13 which engage the sides of the foot and hold the same against lateral movement. In the present apparatus I have secured to the side plates 13 lugs 14 which extend downwardly through slots 15 extending transversely to the platform and are provided at their lower ends with enlarged portions forming nuts 16 in which is mounted a screw threaded rod 17 journaled at its ends in lugs or flanges 18 depending from the respective edges of the platform and provided at one end with a knob or handle 19 by means of which it may be rotated. The end portions of the rod 17 are provided respectively with right and left hand threads so that the rotation of the rod will cause side plates to move simultaneously toward or from each other. Any suitable means may be provided for securing the foot firmly to the platform. Preferably a strap 20 is secured at one end to one edge of the platform, as shown at 21, and means are provided for clamping the other end of the strap firmly to the other edge of the platform and holding the same taut. As shown these clamping means comprise a gripping bar 21 carried by resilient arms 22 rigidly secured to the lower side of the platform 6 and projecting beyond the adjacent edge thereof. The arms are provided with a finger piece 23 by means of which they may be depressed to permit the end of the strap to be inserted between the bar 21 and the adjacent edge of the platform. When released the resilient arms will move the bar upwardly and cause it to grip the strap between the same and the platform and any strain imposed upon the strap will tend to increase the gripping action.

Mounted on the rear portion of the top plate of the base and therefore spaced some distance to the rear of the platform 6 is a heel supporting device. Preferably this device comprises a plurality of heel receiving sockets each adapted to receive a heel of a different size and so mounted that anyone of these sockets may be moved into a position to receive the heel of the foot which is supported on the platform 6. In the present apparatus I have shown the heel supporting device at 24 as mounted on a standard or bracket 25 carried by the base 1, and as rotatable about a horizontal axis extending lengthwise of the base. The supporting device has, in the present instance, three heel receiving sockets 26 arranged radially thereof so that by rotating the device as a whole anyone of these sockets may be brought into an upright position. Any suitable means may be provided for securing the heel supporting device in its adjusted position. In the present instance, the three sockets are cast in one piece and the web of the casting between the respective sockets is provided with radial notches 27 adapted to receive a locking device or latch 28 carried by a rod or shaft 29 journaled in a suitable bearing 30 on the base portion 31 of the standard 25 and provided with a handle 32 by means of which it may be rotated. The latch 28 is preferably provided with a projection or finger 33 to limit its movement with relation to the notch and that portion of the latch which enters the notch is preferably curved or cam shaped so that it may engage the base of the notch with increasing friction or wedging action which will serve to retain the latch in engagement with the casting. If desired the spring 29ª may be applied to the shaft 29 to move the latch toward and retain the same in its operative position. The heel support is adjustable lengthwise of the base and as here shown the top wall is provided with a T-slot 34 in the upper portion of which a rib or lug 35 carried by the base 31 of the standard 25 is slideably mounted. A clamping bolt 36 has its head slideably mounted in the lower and wider portion of the slot and extends through the base of the standard and is provided with a nut 37 having a handle 38 for rotating the same and causing the bolt to clamp the standard in its adjusted position. Stops 39 may be provided to limit the fore and aft movement of the standard and heel support. The heel of the foot may be secured in a selected socket in any suitable manner but I prefer that the means for accomplishing this shall be of such a character that it will be operative when the heel supporting device is in any of its adjusted positions. To this end I have employed a strap 40 connected at its ends with arms 41 extending rearwardly and upwardly from the rear end wall 3 of the base 1, the strap being of sufficient length to enable it to extend about the foot when the standard 25 is in its foremost position.

The pressure device, by means of which upward pressure is applied to a bone or bones of the foot, may take various forms but in the present apparatus I have shown the same as comprising a contact member 42 carried by the upper end of a rod or shank 43 which is supported in a bearing 44. The shank is preferably loosely mounted in the bearing for sliding movement, and is screw threaded to receive a nut 45 which rests upon the upper end of the bearing and the rotation of which serves to adjust the height of the contact member. The contact member 42 is preferably cushioned and may be formed of soft rubber but when formed throughout of soft rubber difficulty is experienced in securing it firmly to the shank and in its preferred form the contact member is slightly tapered and is provided at its lower end with a circumferential flange 46. The contact member rests upon a head or disk 47 carried by the shank 43 and a clamping collar 48 is screw threaded onto this head and provided with a flange which overlaps the flange 46 on the contact member. If the flange 46 is of soft rubber, lateral pressure applied to the contact member tends to pull the flange from beneath the clamping collar and thus detach the contact member from the shank. To overcome this difficulty I have formed the upper portion of the contact member of the soft rubber and have formed the lower portion of relatively hard rubber which is non-elastic and which cannot be pulled from beneath the clamping collar.

The bearing 44 which carries the shank of the pressure device is rotatable about a transverse axis so that the pressure device may be arranged at various angles to the vertical. Preferably the bearing is provided with a tapered boss 49 which is seated in a tapered socket 50 carried by a shank or standard 51. A screw 52 extends through the base of the socket 50 and is screw threaded into the boss 49 and provided with a handle 53, thereby enabling the boss to be drawn tightly into the socket, with a wedging action, and thus locked against rotation. The standard 51 is slideably mounted in a tubular bearing or guideway 54, the upper end of which is split and provided with a clamping device 55 by means of which it may be drawn tightly about the shank 51 to secure the same in its adjusted position. The bearing or guideway 54 is carried by a bar 56 which is adjustably mounted on the base and is preferably arranged below the forward portion of the top wall 4 so that the bearing and pressure device will extend upwardly through the opening 5. The supporting bar 56 is, in the present instance, mounted for both pivotal movement and longitudinal movement and to this end it is provided with a longitudinally extending slot 57 through which extends a pin 58 mounted in the top plate 4 of the base, preferably near the forward end thereof. In the present instance, the upper end of the pin 58 forms the forward stop 12. The bar extends through an opening 59 in the front wall 3 of the base and is provided with a handle 60 by means of which it may be moved either about the axis of the pin 58 or lengthwise relative to the base, thereby enabling the pressure device to be moved to any part of the opening 5 in the top wall of the base. To support the bar 56 against downward movement and to secure the same in adjusted positions I have provided a clamping device which, as here shown, comprises a plate 61 extending transversely of the base and supported beneath the top wall thereof a sufficient distance to permit the passage of the bar 56. Preferably, this plate is rigidly secured near one edge to a rod or shaft 62 journaled at its ends in the side walls of the base. The forward edge of the plate 61 is supported by an actuating member 63 which is here shown as a shaft journaled in the side walls of the base and having an eccentric or cam shaped intermediate portion adapted to support the rear edge of the plate 61 and to press the same into firm engagement with the bar 56 when the shaft 63 is rotated, thus clamping the bar against further movement. One end of the shaft 63 extends beyond the side wall of the base and is provided with a handle 64 by means of which it may be rotated.

The operation of the apparatus will be readily understood from the foregoing description and it will be apparent that I have provided an apparatus which is not only very simple in construction and operation but easy to adjust and has a very wide range of adjustment. When the foot has been positioned on the supporting devices and the pressure device brought into engagement with the bottom of the foot and adjusted to apply the necessary upward pressure on the selected bone or bones, downward pressure is exerted on an adjacent bone or bones. Preferably this is accomplished by applying a suitable implement to the top of the foot, above the adjacent bone, and tapping the same with a mallet or the like. The implement for this purpose may take various forms and may vary in character with different treatments. In Fig. 10 of the drawings I have shown one form of pressure device, which comprises a shank 65 having a curved head shaped to fit the portion of the foot which is to be treated. This head comprises a supporting member 66, which, in the present instance, is rigidly secured to the shank, and has secured thereto a contact member 67 which is preferably constructed of relatively soft material to form a cushion. As here shown, the contact member is of rubber and the outer portion of the same is relatively soft while the inner portion is relatively hard so as to provide non-extensible means for securing the contact member to the supporting member 66. The attaching means may take various forms but, as here shown, bolts 68 have their heads embedded in the hardened inner portion of the contact member and extend through suitable openings in the supporting member 66.

While I have shown and described one embodiment of my invention I wish it to be understood that I do not desire to be limited to the details thereof as various modifications may appear to a person skilled in the art.

Having now fully described my invention what I claim as new and desire to secure by Letters Patent is:

1. In an apparatus of the character described, a base, means carried by said base to support the front portion of a foot, a heel supporting device carried by said base and having a plurality of heel supporting sockets any one of which may be moved into a position to receive the heel of said foot, and a pressure device arranged between said supporting devices to engage the bottom of the foot and to exert upward pressure thereon.

2. In an apparatus of the character described, a base, means carried by said base to support the front portion of a foot, a heel supporting device rotatably mounted on said base and having a plurality of heel receiving sockets any one of which may be moved into a position to receive the heel of said foot, and a pressure device arranged between said supporting devices to engage the bottom of the foot and to exert upward pressure thereon.

3. In an apparatus of the character described, a base, means carried by said base to support the front portion of a foot, a heel supporting device rotatably mounted on said base and having a plurality of heel receiving sockets arranged radially thereto and each adapted to be moved into a position to receive the heel of said foot, and a pressure device arranged between said supporting devices to engage the bottom of said foot and to exert upward pressure thereon.

4. In an apparatus of the character described, a base, means carried by said base to support the front portion of a foot, a heel supporting device adjustably mounted on said base and having a plurality of heel receiving sockets any one of which may be moved into a position to receive the heel of said foot, means to secure said heel supporting device in its adjusted position, and a pressure device arranged between said supporting devices to engage the bottom of said foot and to exert upward pressure thereon.

5. In an apparatus of the character described, a base, means carried by said base to support the front portion of a foot, a heel supporting device rotatably mounted on said base having a plurality of heel receiving sockets and provided with notches, and a locking device carried by said base and adapted to enter any one of said notches to lock said heel supporting device in its adjusted position.

6. In an apparatus of the character described, a base, means carried by said base to support the front portion of a foot, a standard adjustably mounted on said base, a heel supporting device mounted on said standard for rotation about an axis extending lengthwise of said base and having a plurality of radially arranged heel receiving sockets, a locking device mounted on said standard and adapted to engage said heel supporting device to secure same in adjusted position, and a pressure device arranged between said supporting devices to engage the bottom of the foot.

7. In an apparatus of the character described, a base, a platform adjustably mounted on said base and adapted to support the front portion of a foot, laterally adjustable side plates mounted on said platform, a strap secured to one edge of said platform, a yieldable gripping bar mounted at the other edge of platform to grip said strap between the same and the edge of said platform, a heel supporting device, and a pressure device arranged between said heel supporting device and said platform to engage the bottom of said foot.

8. In an apparatus of the character described, a base, supporting devices carried by said base, spaced one from the other and adapted respectively to support the front portion and the heel of a foot, a bar pivotally mounted on said base, means to secure said bar in adjusted positions, and a pressure device carried by said bar and arranged between said supporting devices to engage the bottom of said foot and to exert upward pressure thereon.

9. In an apparatus of the character described, a base, supporting devices carried by said base, spaced one from the other and adapted respectively to support the front portion and the heel of a foot, a bar mounted on said base for both pivotal and lengthwise movement, means to secure said bar in adjusted positions, and a pressure device carried by said bar and arranged between said supporting devices to engage the bottom of said foot.

10. In an apparatus of the character described, a base comprising a top wall having an opening between the ends thereof, supporting devices carried by said base on opposite sides of said opening and adapted respectively to support the front portion and heel of a foot, a bar mounted beneath said top wall of said base for both pivotal and longitudinal movement relative thereto, and a pressure device carried by said bar and extending through said opening to engage the bottom of the foot.

11. In an apparatus of the character described, a base comprising a top wall having an opening between the ends thereof, supporting devices carried by said base on opposite sides of said opening and adapted respectively to support the front portion and the heel of a foot, a bar mounted on said base beneath said top wall for movement both transversely and lengthwise of said base, a pressure device carried by said bar and extending through said opening to engage said foot, and means to secure said bar in adjusted positions.

12. In an apparatus of the character described, a base comprising a top wall having an opening between the ends thereof, supporting devices carried by said base on opposite sides of said opening and adapted respectively to support the front portion and the heel of a foot, a bar mounted on said base beneath said top wall for movement both transversely and lengthwise of said base, a pressure device carried by said bar and extending through said opening to engage said foot, and a clamping device arranged beneath said top wall and adapted to engage said bar to clamp the same in adjusted positions.

13. In an apparatus of the character described, a base comprising a top wall having an opening between the ends thereof, supporting devices carried by said base on opposite sides of said opening and adapted respectively to support the front portion and the heel of a foot, a bar mounted on said base beneath said top wall for movement both transversely and lengthwise of said base, a pressure device carried by said bar and extending through said opening to engage said foot, and a shaft journaled in said base beneath said bar and having an eccentrically arranged portion to clamp said bar against said top wall.

14. In an apparatus of the character described, a base comprising a top wall having an opening between the ends thereof, supporting devices carried by said base on opposite sides of said opening and adapted respectively to support the front portion and the heel of a foot, a bar mounted on said base beneath said top wall for movement both transversely and lengthwise of said base, a pressure device carried by said bar and extending through said opening to engage said foot, a plate pivotally mounted on said base beneath said bar, a shaft mounted beneath said plate and having a part adapted to engage said plate to force the same into engagement with said bar.

15. In an apparatus of the character described, a base comprising a top wall having an opening therein, supporting devices carried by said base on the opposite sides of said opening and adapted respectively to support the front portion and the heel of a foot, a bar mounted beneath said top wall for movement both transverse and longitudinally of said base, means to secure said bar in adjusted positions with relation to said base, and a pressure device carried by said bar and extending through said opening, said pressure device comprising a part adjustable about a horizontal axis.

16. In an apparatus of the character described, a base comprising a top wall having an opening therein, supporting devices carried by said base on the opposite sides of said opening and adapted respectively to support the front portion and the heel of a foot, a bar mounted beneath said top wall for movement both transverse and longitudinally of said base, means to secure said bar in adjusted positions with relation to said base, a pressure device comprising a vertical shank adjustably mounted on said bar, a bearing mounted on said shank for adjustment about a horizontal axis, a second shank adjustably mounted in said bearing, and a contact member carried by second shank.

17. In an apparatus of the character described, a base comprising a top wall having an opening therein, supporting devices carried by said base on the opposite sides of said opening and adapted respectively to support the front portion and the heel of a foot, a bar mounted beneath said top wall for movement both transverse and longitudinally of said base, means to secure said bar in adjusted positions with relation to said base, and a pressure device carried by said bar and comprising a part having a head, a clamping collar mounted on said head, and a contact member having a soft upper portion and a rigid lower portion to be engaged by said clamping collar.

18. In an apparatus of the character described, a base comprising a top wall having an opening therein, supporting devices carried by said base on the opposite sides of said opening and adapted respectively to support the front portion and the heel of a foot, a bar mounted beneath said top wall for movement both transverse and longitudinally of said base, means to secure said bar in adjusted positions with relation to said base, and a pressure device carried by said bar and comprising a part having a head, a clamping collar mounted on said head, and a one piece contact member having its upper portion formed of soft rubber and its lower portion formed of hard rubber adapted to be engaged by the clamping collar.

In testimony whereof, I affix my signature hereto.

LESTER J. KARPF.